United States Patent
Kobayashi et al.

(10) Patent No.: US 12,383,867 B2
(45) Date of Patent: Aug. 12, 2025

(54) METHOD FOR OPERATING MEMBRANE FILTRATION UNIT AND MEMBRANE FILTRATION UNIT

(71) Applicant: Toray Industries, Inc., Tokyo (JP)

(72) Inventors: Kentaro Kobayashi, Otsu (JP); Atsushi Kobayashi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 725 days.

(21) Appl. No.: 17/432,675

(22) PCT Filed: Feb. 26, 2020

(86) PCT No.: PCT/JP2020/007878
§ 371 (c)(1),
(2) Date: Aug. 20, 2021

(87) PCT Pub. No.: WO2020/175593
PCT Pub. Date: Sep. 3, 2020

(65) Prior Publication Data
US 2022/0032234 A1 Feb. 3, 2022

(30) Foreign Application Priority Data
Feb. 26, 2019 (JP) .................................. 2019-032311

(51) Int. Cl.
*B01D 63/04* (2006.01)
*B01D 63/02* (2006.01)
(Continued)

(52) U.S. Cl.
CPC ......... *B01D 63/046* (2013.01); *B01D 63/024* (2013.01); *B01D 65/02* (2013.01);
(Continued)

(58) Field of Classification Search
CPC ............ B01D 2317/04; B01D 2321/12; B01D 2321/14; B01D 2321/2083; B01D 63/02
See application file for complete search history.

(56) References Cited

U.S. PATENT DOCUMENTS

| 5,681,465 A | 10/1997 | Takenoya et al. |
| 7,364,653 B1 | 4/2008 | Slegers |

(Continued)

FOREIGN PATENT DOCUMENTS

| CN | 101730577 A | 6/2010 |
| CN | 104656437 A | 4/2015 |

(Continued)

OTHER PUBLICATIONS

Partial Supplementary European Search Report for European Application No. 20 762 959.3, dated Aug. 25, 2022, 15 pages.

(Continued)

*Primary Examiner* — Ryan B Huang
(74) *Attorney, Agent, or Firm* — Buchanan Ingersoll & Rooney PC

(57) ABSTRACT

The present invention relates to a method of operating a membrane filtration unit including plural hollow fiber membrane modules connected to each other in parallel, the method including: a filtration step; a collection step; and a recovery step, in which a relation of $n_1 \geq n_2 > n_3$ is satisfied, where $n_1$ is the number of the hollow fiber membrane modules simultaneously used in executing the filtration step, $n_2$ is the number of the hollow fiber membrane modules simultaneously used in executing the collection step, and $n_3$ is the number of the hollow fiber membrane modules simultaneously used in executing the recovery step.

6 Claims, 4 Drawing Sheets

(51) Int. Cl.
  *B01D 65/02*  (2006.01)
  *B01D 65/08*  (2006.01)
  *B01D 71/34*  (2006.01)
  *C02F 1/44*   (2023.01)
  *C02F 103/32* (2006.01)

(52) U.S. Cl.
  CPC ............ *B01D 65/08* (2013.01); *B01D 71/34* (2013.01); *C02F 1/44* (2013.01); *B01D 2221/06* (2013.01); *B01D 2311/14* (2013.01); *B01D 2313/24* (2013.01); *B01D 2315/10* (2013.01); *B01D 2315/20* (2013.01); *B01D 2317/04* (2013.01); *B01D 2321/04* (2013.01); *B01D 2321/12* (2013.01); *B01D 2321/18* (2013.01); *B01D 2325/38* (2013.01); *C02F 2103/32* (2013.01)

(56) References Cited

U.S. PATENT DOCUMENTS

| | | |
|---|---|---|
| 2008/0179244 A1 | 7/2008 | Morgan et al. |
| 2009/0152199 A1* | 6/2009 | Ma .......................... C02F 1/04 210/640 |
| 2017/0209834 A1 | 7/2017 | Cohen et al. |
| 2018/0021734 A1 | 1/2018 | Eder et al. |
| 2018/0116265 A1 | 5/2018 | Demoulin et al. |
| 2019/0015786 A1* | 1/2019 | Shimura ................ B01D 71/34 |
| 2019/0083936 A1 | 3/2019 | Loewe et al. |
| 2020/0038812 A1* | 2/2020 | Negrin .................. B01D 63/02 |

FOREIGN PATENT DOCUMENTS

| | | |
|---|---|---|
| DE | 202006011219 U1 | 9/2005 |
| EP | 1782874 A1 | 5/2007 |
| FR | 2909291 A1 | 6/2008 |
| JP | 06285340 A | 10/1994 |
| JP | 0866608 A | 3/1996 |
| JP | 09234350 A | 9/1997 |
| JP | 2002525196 A | 8/2002 |
| JP | 2008207158 A | 9/2008 |
| JP | 2013075291 A | 4/2013 |
| JP | 2018158297 A | 10/2018 |
| WO | 0018497 A1 | 4/2000 |
| WO | 2013047466 A1 | 4/2013 |
| WO | 2017032560 A1 | 3/2017 |

OTHER PUBLICATIONS

International Search Report and Written Opinion for International Application No. PCT/JP2020/007878, dated Apr. 14, 2020, 6 pages.
Chinese Office Action for Chinese Application No. 202080017064.6, dated Nov. 3, 2022 with translation, 22 pages.
Extended European Seach Report for European Application No. 20762959.3, dated Nov. 15, 2022, 15 pages.

* cited by examiner

METHOD FOR OPERATING MEMBRANE FILTRATION UNIT AND MEMBRANE FILTRATION UNIT

CROSS REFERENCE TO RELATED APPLICATIONS

This is the U.S. National Phase application of PCT/JP2020/007878, filed Feb. 26, 2020, which claims priority to Japanese Patent Application No. 2019-032311, filed Feb. 26, 2019, the disclosures of each of these applications being incorporated herein by reference in their entireties for all purposes.

FIELD OF THE INVENTION

The present invention relates to a method of operating a membrane filtration unit and a membrane filtration unit.

BACKGROUND OF THE INVENTION

Membrane filtration using separation membranes is used in various fields such as a water treatment field such as drinking water manufacture, water purification treatment, and effluent treatment, a fermentation field that involves cultivation of microbes or cultivation cells, and a food industry field. Among those kinds of membrane filtration, membrane filtration using a hollow fiber membrane module is used in many fields because of its advantages such as a large treatment liquid amount and ease of cleaning.

In the food industry field, in many cases the raw liquid turbidity is higher than in the water treatment field and hence separation membranes are clogged fast in a dead-end filtration operation which is employed frequently in the water treatment field. Thus, in uses in this field, a crossflow filtration operation is performed in which the clogging of separation membranes proceeds more slowly. The crossflow filtration operation is a method in which parallel flows of raw liquid always act on the surfaces of separation membranes and part of the raw liquid is filtered. This method can greatly lower the occurrence of clogging of the separation membranes because an operation is performed while accumulation of suspended solids on the surfaces of the separation membranes is prevented by the action of flows that are parallel with the surfaces of the separation membranes.

On the other hand, in the crossflow filtration operation, a large amount of raw liquid remains in the hollow fiber membrane module or piping of a membrane filtration unit because more additional pieces of equipment such as a concentrate pipe are necessary than in the dead-end filtration operation. In the food industry field, since it is important to minimize the amount of residual raw liquid from the viewpoint of increasing the recovery rate, a membrane filtration unit for minimizing the residual raw liquid and an operation method thereof are desired.

In this connection, Patent document 1 discloses a method in which pressurized gas is introduced to the raw liquid side in a tank that includes a filtration element and all of raw liquid remaining in the tank is thereby recovered to the filtrate side. Also in a filtration unit using separation membranes, a recovery method can be performed in which liquid remaining on the raw liquid side is pushed out to the filtrate side by introducing pressurized gas to the raw liquid side and liquid remaining in filtrate side piping is pushed out by passage of air through the separation membranes.

Patent document 2 discloses, as another recovery method, a method in which in a membrane filtration unit including plural hollow fiber membrane modules raw liquid remaining in the hollow fiber membrane modules and piping is collected into one hollow fiber membrane module and subjected to membrane filtration there.

PATENT LITERATURE

Patent document 1: JP-A-H08-066608
Patent document 2: WO 2000/018497

SUMMARY OF THE INVENTION

However, the method disclosed in Patent document 1 has a problem that where separation membranes using a highly hydrophobic polymer is employed, if a method of pushing raw liquid by passing pressurized gas from the raw liquid side of the membranes to their filtrate side, the membranes are dried to cause a problem that when the liquid is filtrated again the pure water permeability becomes lower than at the beginning and hence the amount of filtered liquid obtained is reduced. On the other hand, where pressurized gas is introduced to only the raw liquid side so as not to dry the membranes, a problem arises that liquid remaining on the filtrate side of the separation membranes cannot be recovered.

Also the method disclosed in Patent document 2 cannot reduce the amount of liquid remaining on the filtrate side of the separation membranes.

In view of the above, an object of the present invention is to provide an operating method of a membrane filtration unit and a membrane filtration unit for reducing the amount of liquid remaining in the filtrate sides in a membrane filtration unit even in a case of using a highly hydrophobic resin as separation membranes.

To attain the above object, an exemplary embodiment of the present invention provides the following methods of operating a membrane filtration unit.

(1) A method of operating a membrane filtration unit, the membrane filtration unit including plural hollow fiber membrane modules connected to each other in parallel, each hollow fiber membrane module including a container which has a raw liquid inlet, a filtrate outlet, and a raw liquid outlet and is filled with hollow fiber membranes,
the method including:
a filtration step of introducing a raw liquid into the container from the raw liquid inlet, filtering the raw liquid through the hollow fiber membranes from a primary side to a secondary side, and leading out resulting filtrate to outside the container from the filtrate outlet;
a collection step of causing the filtrate existing in the container to flow in a reverse direction through the hollow fiber membranes from the secondary side to the primary side and leading out resulting backflow liquid to outside the container from at least one of the raw liquid inlet and the raw liquid outlet; and
a recovery step of introducing the backflow liquid into the container again from at least one of the raw liquid inlet and the raw liquid outlet, filtering the backflow liquid through the hollow fiber membranes from the primary side to the secondary side, and leading out resulting recovery liquid to outside the container from the filtrate outlet,
in which a relation of $n_1 \geq n_2 > n_3$ is satisfied, where $n_1$ is the number of the hollow fiber membrane modules simultaneously used in executing the filtration step, $n_2$ is the number of the hollow fiber membrane modules simultaneously used in executing the collection step, and $n_3$ is the number of the hollow fiber membrane modules simultaneously used in executing the recovery step.

(2) The method of operating a membrane filtration unit according to item (1), in which the hollow fiber membrane module used in executing the recovery step is different from the hollow fiber membrane module used in executing the collection step.

(3) The method of operating a membrane filtration unit according to item (2), in which the collection step and the recovery step are executed simultaneously.

(4) The method of operating a membrane filtration unit according to item (3), in which the collection step and the recovery step are executed using pressurized gas and a pressure P2 of the pressurized gas used in executing the collection step and a pressure P3 of the pressurized gas used in executing the recovery step satisfy a relation of P3<P2.

(5) The method of operating a membrane filtration unit according to any one of items (1) to (4), in which the raw liquid inlet of the hollow fiber membrane module used in executing the recovery step is located below the raw liquid inlet of the hollow fiber membrane module that is not used in executing the recovery step in a vertical direction.

(6) The method of operating a membrane filtration unit according to any one of items (1) to (5), in which the hollow fiber membranes are membranes made of a hydrophobic resin.

(7) The method of operating a membrane filtration unit according to item (6), in which the hydrophobic resin includes polyvinylidene difluoride.

To attain the above object, the present invention according to exemplary embodiments provides the following membrane filtration units:

(8) A membrane filtration unit including plural hollow fiber membrane modules connected to each other in parallel, each hollow fiber membrane module including a container which has a raw liquid inlet, a filtrate outlet, and a raw liquid outlet and is filled with hollow fiber membranes, in which a first pressurized gas introduction pipe for introducing a pressurized gas is connected to a pipe or a tank that is connected to the raw liquid inlet or raw liquid outlet, a second pressurized gas introduction pipe for introducing a pressurized gas is connected to a pipe that is connected to the filtrate outlet, and part of the hollow fiber membrane modules includes a valve in the pipe that connects the filtrate outlet and the second pressurized gas introduction pipe.

(9) The membrane filtration unit according to item (8), in which part of the hollow fiber membrane modules further includes a bypass pipe that connects the filtrate outlet and a filtrate recovery pipe or a filtrate tank, and the bypass pipe is not connected to the second pressurized gas introduction pipe.

(10) The membrane filtration unit according to item (9), in which a pipe diameter of the bypass pipe is smaller than a pipe diameter of the filtrate recovery pipe.

According to the present invention, the amount of liquid remaining in the filtrate sides in a membrane filtration unit can be reduced to a large extent even in a case of using a highly hydrophobic resin as separation membranes, whereby the raw liquid recovery rate can be increased. Furthermore, the time taken to recover liquid remaining in the filtrate sides of the membrane filtration unit can be shortened, whereby the operating rate of the machine can be increased remarkably.

DETAILED DESCRIPTION OF EMBODIMENTS OF THE INVENTION

Although embodiments of the present invention will be hereinafter described in detail with reference to the drawings, the present invention is not restricted by them at all.

A membrane filtration unit to which an operating method of the embodiment is applied is required to include plural hollow fiber membrane modules in each of which hollow fiber membranes fill a container having a raw liquid inlet, a filtrate outlet, and a raw liquid outlet.

Figure 1:
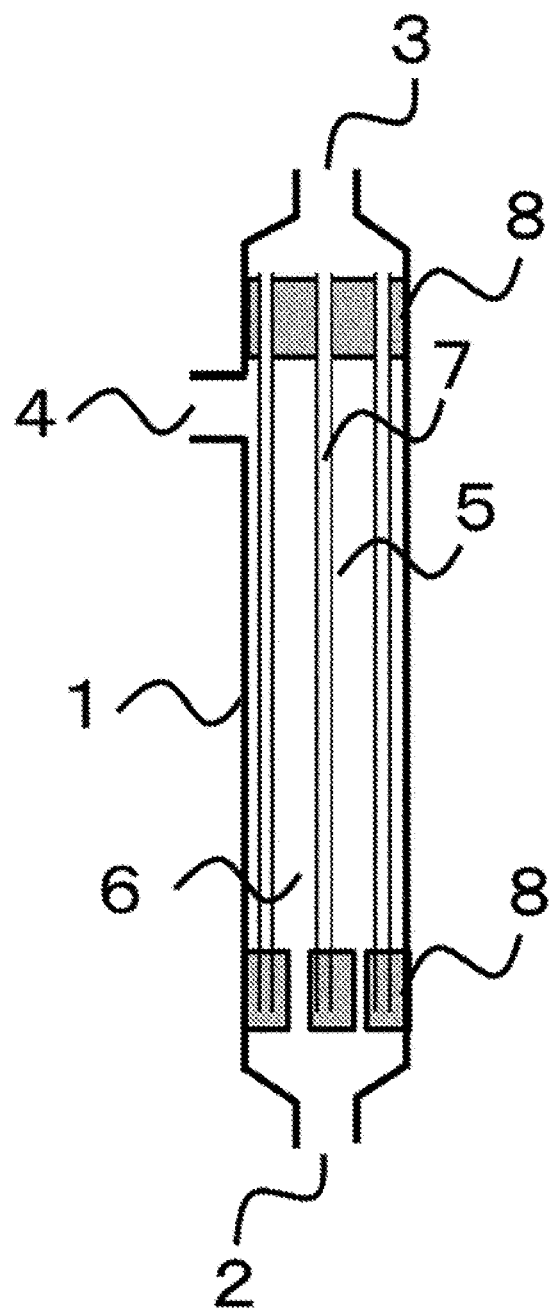
FIG. 1 is a schematic diagram showing one form of a hollow fiber membrane module of a membrane filtration unit to which an operating method according to embodiments of the present invention is applied.
Figure 2:
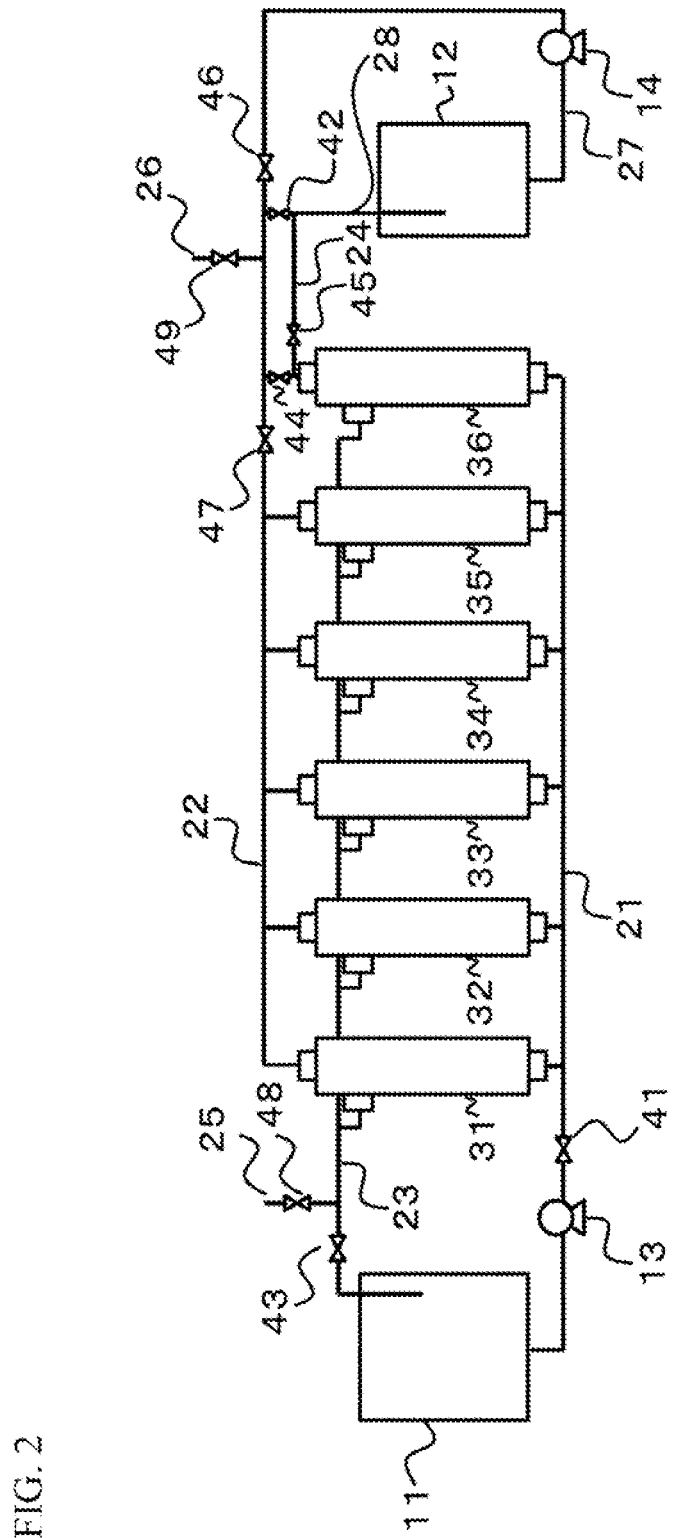
FIG. 2 is a rough flow diagram showing one form of a membrane filtration unit to which the operating method according to embodiments of the present invention is applied.

FIG. 1 is a schematic diagram showing one form of a hollow fiber membrane module of the membrane filtration unit to which the operating method of the embodiment is applied. FIG. 2 is a rough flow diagram showing one form of membrane filtration unit to which the operating method of the embodiment is applied. In each of plural hollow fiber membrane modules 31-36, as shown in FIG. 1, hollow fiber membranes 5 fill a container 1 having a raw liquid inlet 2, a filtrate outlet 3, and a raw liquid outlet 4.

Each of the hollow fiber membrane modules 31-36 is separated into a raw liquid-side space 6 (hereinafter referred to as a primary side) and a filtrate-side space 7 (hereinafter referred to as a secondary side) by the hollow fiber membranes 5 that fill the container 1. The raw liquid inlet 2 is provided in the primary side and the filtrate outlet 3 is provided in the secondary side. Each of the hollow fiber membrane modules 31-36 has the raw liquid outlet 4 which is provided in the primary side and leads out raw liquid introduced into the container 1.

In the membrane filtration unit to which the operating method of the embodiment is applied, it is required that the plural hollow fiber membrane modules (mentioned above) be connected to each other in parallel. The phrase "connected to each other in parallel" means a connection form where liquid brought by one pipe is divided into plural liquids and then introduced, as liquids having the same quality, into the plural respective hollow fiber membrane modules that are arranged adjacent to each other or liquids that are led out of the plural hollow fiber membrane modules arranged adjacent to each other are gathered into one pipe, and the plural hollow fiber membrane modules are connected together by pipes.

The operating method of a membrane filtration unit according to the embodiment includes three steps described below.

(1) A filtration step is a step of introducing raw liquid into the container from the raw liquid inlet, filtering the raw liquid through the hollow fiber membranes from the primary side to the secondary side, and leading out resulting filtrate to outside the container from the filtrate outlet.

In the hollow fiber membrane module exemplified in FIG. 1, the raw liquid is introduced into the container 1 from the raw liquid inlet 2 and filtered through the hollow fiber membranes 5 from the primary side to the secondary side, and resulting filtrate is led out to outside the container 1 from the filtrate outlet 3. It is preferable that the filtration through the hollow fiber membranes from the primary side to the secondary side be pressure filtration.

(2) A collection step is a step of causing the filtrate existing in the container to flow in the reverse direction through the hollow fiber membranes from the secondary side to the primary side and leading out resulting backflow liquid to outside the container from at least one of the raw liquid inlet and the raw liquid outlet.

In the hollow fiber membrane module exemplified in FIG. 1, filtrate existing in the secondary side in the container 1 is caused to flow reversely through the hollow fiber membranes 5 from the secondary side to the primary side and resulting backflow liquid is led out to outside the container 1 from the raw liquid inlet 2 and/or the raw liquid outlet 4.

(3) A recovery step is a step of introducing the backflow liquid into the container again from at least one of the raw liquid inlet and the raw liquid outlet, filtering the backflow liquid through the hollow fiber membranes from the primary side to the secondary side, and leading out resulting recovery liquid to outside the container from the filtrate outlet.

In the hollow fiber membrane module exemplified in FIG. 1, the backflow liquid is introduced into the container 1 from the raw liquid inlet 2 and/or the raw liquid outlet 4 and filtered through the hollow fiber membranes 5 from the primary side to the secondary side, and resulting recovery liquid is led out to outside the container 1 from the filtrate outlet. It is preferable that the filtration through the hollow fiber membranes from the primary side to the secondary side be pressure filtration.

In the operating method of a membrane filtration unit according to the embodiment, it is necessary that a relationship of the following Inequality (I) needs to be satisfied, where $n_1$ is the number of the hollow fiber membrane modules simultaneously used in executing the filtration step, $n_2$ is the number of the hollow fiber membrane modules simultaneously used in executing the collection step, and $n_3$ is the number of the hollow fiber membrane modules simultaneously used in executing the recovery step:

$$n_1 \geq n_2 > n_3 \quad (1).$$

(Membrane Filtration Unit)

In the membrane filtration unit according to the embodiment, the plural hollow fiber membrane modules are connected to each other in parallel. In each of the hollow fiber membrane modules, the hollow fiber membranes fill the container having the raw liquid inlet, the filtrate outlet, and the raw liquid outlet.

A first pressurized gas introduction pipe for introducing pressurized gas is connected to a pipe or a tank that is connected to the raw liquid inlet or the raw liquid outlet of the hollow fiber membrane module. A second pressurized gas introduction pipe for introducing pressurized gas is connected to a pipe that is connected to the filtrate outlet. In part of the hollow fiber membranes modules, a valve is provided on a pipe that connects the filtrate outlet and the second pressurized gas introduction pipe.

It is preferable that part of the hollow fiber membrane modules further includes a bypass pipe that connects the filtrate outlet and a filtrate recovery pipe or a filtrate tank, and it is preferable that the bypass pipe is not connected to the second pressurized gas introduction pipe.

In the one form of the membrane filtration unit exemplified in FIG. 2, a raw liquid tank 11 is connected to the raw liquid inlets of the hollow fiber membrane modules 31-36 by a supply liquid pipe 21. The supply liquid pipe 21 branches in the rear of a supply pump 13 and a supply liquid valve 41 which are disposed at halfway positions of the supply liquid pipe 21 and are connected to the hollow fiber membrane modules 31-36 in parallel. The filtrate outlets of the hollow fiber membrane modules 31-36 are connected to a filtrate tank 12 in parallel by a filtrate pipe 22. The raw liquid outlets of the hollow fiber membrane modules 31-36 are connected to the raw liquid tank 11 in parallel by a concentrate pipe 23. A filtrate valve 42 is disposed at a halfway position of the filtrate pipe 22 and a concentrate valve 43 is disposed at a halfway position of the concentrate pipe 23.

Furthermore, a filtrate division valve 44 for separating filtrate led out of the hollow fiber membrane modules 31-35 from filtrate led out of the hollow fiber membrane module 36 so that they do not come into contact with each other is disposed at a halfway position of the filtrate pipe 22.

A second pressurized gas introduction pipe 26 for introducing gas at a halfway position of which a filtrate gas introduction valve 49 is disposed is connected to the filtrate pipe 22 before the filtrate valve 42. Likewise, a first pressurized gas introduction pipe 25 for introducing gas at a halfway position of which a concentrate gas introduction valve 48 is disposed is connected to the concentrate pipe 23 before the concentrate valve 43.

The filtrate tank 12 is further connected to the filtrate pipe 22 by a backwash pipe 27. A backwash pump 14 and a backwash valve 46 for sending filtrate to the hollow fiber membrane modules 31-36 from the filtrate tank 12 are disposed at a halfway position of the backwash pipe 27.

A filtrate bypass pipe 24 is connected between the filtrate outlet of the hollow fiber membrane module 36 of the filtrate pipe 22 and the filtrate division valve 44. The other end of the filtrate bypass pipe 24 is connected to a filtrate recovery pipe 28 provided between the filtrate valve 42 of the filtrate pipe 22 and the filtrate tank 12. A filtrate bypass valve 45 is disposed at a halfway position of the filtrate bypass pipe 24. To reduce the amount of residual liquid, it is preferable that the filtrate bypass pipe 24 be thinner than the filtrate pipe 22.

A backwash bypass valve 47 for separation is disposed at a halfway position of the filtrate pipe 22 to prevent filtrate sent from the filtrate tank 12 by the backwash pump 14 from being introduced into the hollow fiber membrane modules 31-35.

The operating method of the membrane filtration unit according to the embodiment will be described using specific examples while referring to FIG. 2 mainly.

(Operating Method of Membrane Filtration Unit: Filtration Step)

In a filtration step, for example, raw liquid is supplied to the hollow fiber membrane modules 31-36 by the supply pump 13 and a crossflow filtration operation is performed. In the crossflow filtration operation, raw liquid is introduced into the primary side (raw liquid-side space 6) in the container 1 from the raw liquid inlets 2 of the hollow fiber membrane modules 31-36, moves through the primary side in the container 1 as flows that are parallel with the surfaces of the hollow fiber membranes 5, and part of the raw liquid is filtered into the secondary side (filtrate-side space 7) in the container 1 preferably under pressurization. Filtrate is led out of the container 1 from the filtrate outlets 3 and sent to the filtrate tank 12 via the filtrate pipe 22. On the other hand, unfiltered raw liquid is led out from the raw liquid outlets 4 as concentrate and sent to the raw liquid tank 11 via the concentrate pipe 23. At this time, the supply liquid valve 41 is open, the filtrate valve 42 is open, the concentrate valve 43 is open, the filtrate division valve 44 is open, the filtrate bypass valve 45 is closed, the backwash valve 46 is closed, the backwash bypass valve 47 is open, the concentrate gas introduction valve 48 is closed, and the filtrate gas introduction valve 49 is closed.

In many cases, the crossflow filtration operation is performed until raw liquid has been filtered for a prescribed time or by a prescribed amount and the amount of liquid remaining in the raw liquid tank 11 becomes small so that operation of the supply pump 13 become difficult. Since in this case residual liquid exists in the supply liquid pipe 21, the primary side and the secondary side in the containers 1 of the hollow fiber membrane modules 31-36, the filtrate pipe 22, and the concentrate pipe 23, the residual liquid is required to be recovered into the filtrate tank 12 as much as possible to increase the recovery rate.

To this end, it is preferable that after operation of the supply pump 13 become difficult, residual liquid existing in the primary sides in the containers 1 of the hollow fiber membrane modules and the concentrate pipe 23 located between the raw liquid outlets 4 of the hollow fiber membrane modules 31-36 and the concentrate valve 43 be subjected to gas pressure filtration by introducing pressurized gas from the first pressurized gas introduction pipe 25. At this time, the supply liquid valve 41 is closed, the filtrate valve 42 is open, the concentrate valve 43 is closed, the filtrate division valve 44 is open, the filtrate bypass valve 45 is closed, the backwash valve 46 is closed, the backwash bypass valve 47 is open, the concentrate gas introduction valve 48 is open, and the filtrate gas introduction valve 49 is closed.

As a result of the gas pressure filtration, the concentrate pipe 23 and the primary sides in the containers 1 of the hollow fiber membrane modules 31-36 become empty. Filtrate is led out of the containers 1 from the filtrate outlets 3 and sent to the filtrate tank 12 via the filtrate pipe 22. On the other hand, residual liquid exists in the supply liquid pipe 21, the secondary sides in the containers 1 of the hollow fiber membrane modules 31-36, and the filtrate pipe 22.

In the filtration process, a dead-end filtration operation may be performed instead of the crossflow filtration operation. In the dead-end filtration operation, although raw liquid is introduced into the primary sides in the containers 1 from the filtrate outlets 3 of the hollow fiber membrane modules, the raw liquid that has been introduced into the primary sides in the containers 1 is not led out from the raw liquid outlets 4 and is all filtered from the primary sides to the secondary sides under pressurization. Filtrate is led out of the containers 1 from the filtrate outlets 3 and sent to the filtrate tank 12 via the filtrate pipe 22 as in the case of the crossflow filtration operation. At this time, the supply liquid valve 41 is open, the filtrate valve 42 is open, the concentrate valve 43 is closed, the filtrate division valve 44 is open, the filtrate bypass valve 45 is closed, the backwash valve 46 is closed, the backwash bypass valve 47 is open, the concentrate gas introduction valve 48 is closed, and the filtrate gas introduction valve 49 is closed.

In the one form of the membrane filtration unit exemplified in FIG. 2, concentrate is sent to the raw liquid tank 11 in many cases. Alternatively, all or part of concentrate is sent to a downstream stage of the supply pump 13. This configuration can lower the motive power consumption of the supply pump 13. In this case, it is preferable that a circulation pump be provided downstream of the supply pump 13 so that concentrate is sent between the supply pump 13 and the circulation pump.

Whereas a common method for causing pressurization in the membrane filtration unit is to use the supply pump 13 as shown in FIG. 2, gas pressure filtration may be performed by introducing pressurized gas into the raw liquid tank 11, the supply liquid pipe 21, or the concentrate pipe 23. In the food industry field, it is preferable to use, for example, nitrogen gas or carbon dioxide gas as pressurized gas and it is even preferable to use sterilized gas.

In the filtration step, the above-described crossflow filtration operation or the dead-end filtration operation may be performed singly; alternatively, the crossflow filtration operation and the dead-end filtration operation may be performed in combination. It is also possible to perform filtration by causing suction in the secondary sides in the container 1 instead of causing pressurization in the primary sides in the container 1. In this case, for example, a suction pump may be provided at a halfway position of the filtrate pipe 22.

If the filtration step is continued for a long time, the clogging of the hollow fiber membranes 5 proceeds and thus the membrane filtration amount may decrease or the pressure necessary for the filtration may increase. To avoid such a situation, it is preferable to clean the hollow fiber membrane modules 31-36 on a regular basis.

A preferable method for cleaning the hollow fiber membrane modules 31-36 is backwashing of washing away suspended solids accumulated inside or on the surfaces of the hollow fiber membranes 5 by reverse filtration of sending filtrate to the hollow fiber membrane modules 31-36 by the backwash pump 14 and then pressuring filtrate from the secondary side to the primary side in each container 1. At this time, the supply liquid valve 41 is closed, the filtrate valve 42 is closed, the concentrate valve 43 is open, the filtrate division valve 44 is open, the filtrate bypass valve 45 is closed, the backwash valve 46 is open, the backwash bypass valve 47 is open, the concentrate gas introduction valve 48 is closed, and the filtrate gas introduction valve 49 is closed. Alternatively, backwashing may be performed while raw liquid is supplied to the hollow fiber membrane modules 31-36 by opening the supply liquid valve 41 and causing the supply pump 13 to operate.

Although there are no limitations on the number $n_1$ of hollow fiber membrane modules that are used simultaneously to execute the filtration step, it is preferable to use all of the plural hollow fiber membrane modules that are connected to each other in parallel.

(Membrane Filtration Unit Operating Method: Collection Step)

In the collection step, first, manipulations are performed to cause filtrate existing in the secondary sides in the containers 1 of the hollow fiber membrane modules 31-36, that is, residual liquid, to flow in the reverse direction to the primary sides of the hollow fiber membranes and thereby obtain backflow liquid. More specifically, pressurized gas is introduced from the second pressurized gas introduction pipe 26 to pressurize the secondary sides in the containers 1 of the hollow fiber membrane modules 31-36, whereby filtrate existing in the secondary sides in the container 1 and the filtrate pipe 22 located between the filtrate outlets 3 of the hollow fiber membrane modules 31-36 and the filtrate valve 42 and the backwash valve 46 is caused to flow in the reverse direction to the primary sides. At this time, the supply liquid valve 41 is closed, the filtrate valve 42 is closed, the concentrate valve 43 is open, the filtrate division valve 44 is open, the filtrate bypass valve 45 is closed, the backwash valve 46 is closed, the backwash bypass valve 47 is open, the concentrate gas introduction valve 48 is closed, and the filtrate gas introduction valve 49 is open.

Backflow liquid is accumulated in the primary sides in the containers 1 or led out from the raw liquid inlet 2 and accumulated in the pipe to which the raw liquid inlets 2 are connected. Depending on the capacities of the secondary side of each container 1 and the filtrate pipe 22, there may occur an event that not all backflow liquid is accommodated in the primary sides in the containers 1 and part of the backflow liquid overflows from the raw liquid outlets 4 to flow into the concentrate pipe 23. Backflow liquid may be led out from the raw liquid inlets 2 and the raw liquid outlet 44 at the same time.

Next, manipulations are performed to lead out backflow liquid existing in the primary sides in the containers 1 of the hollow fiber membrane modules 31-35 to outside the containers 1 from the raw liquid inlets 2 by introducing pressurized gas from the first pressurized gas introduction pipe 25. At this time, the supply liquid valve 41 is closed, the filtrate valve 42 is closed, the concentrate valve 43 is closed, the filtrate division valve 44 is closed, the filtrate bypass valve 45 is open, the backwash valve 46 is closed, the backwash bypass valve 47 is closed, the concentrate gas introduction valve 48 is open, and the filtrate gas introduction valve 49 is closed.

Backflow liquid may be led out of the containers 1 from the raw liquid outlets 4 simultaneously with or instead of that backflow liquid is led out of the containers 1 from the raw liquid inlets 2. Where backflow liquid is led out of the containers 1 from the raw liquid outlets 4, pressurized gas is introduced from the pipe to which the raw liquid inlets 2 are connected. Where backflow liquid is led out of the containers 1 from both of the raw liquid inlets 2 and the raw liquid outlets 4, pressurized gas is introduced from the second pressurized gas introduction pipe 26 which is connected to the filtrate outlets 3.

Since the backwash bypass valve 47 is closed, even if pressurized gas is introduced from the first pressurized gas introduction pipe 25, almost no part of backflow liquid existing in the primary sides in the containers 1 of the hollow fiber membrane modules 31-35 is filtered into the secondary sides and, instead, the backflow liquid is led out to outside the containers 1 from the raw liquid inlets 2, sent to the hollow fiber membrane module 36 via the supply liquid pipe 21, and collected there.

At the end of the above-exemplified collection step, whereas the secondary sides in the containers 1 of the hollow fiber membrane modules 31-36 and the filtrate pipe 22 located between the filtrate outlets 3 of the hollow fiber membrane modules 31-36 and the filtrate valve 42 and the backwash valve 46 are empty, residual liquid remains in the supply liquid pipe 21, the primary sides in the containers 1 of the hollow fiber membrane modules 31-36, and the concentrate pipe 23.

Manipulations for obtaining backflow liquid is not limited to the above-described manipulations of a method of introducing pressurized gas from the second pressurized gas introduction pipe 26, and can be manipulations of a method of causing filtrate to flow in the reverse direction from the secondary sides to the primary sides in the containers 1 by opening the filtrate pipe 22 to the atmospheric pressure. At this time, for example, following settings can be made: the supply liquid valve 41 is closed, the filtrate valve 42 is open, the concentrate valve 43 is open, the filtrate division valve 44 is open, the filtrate bypass valve 45 is closed, the backwash valve 46 is closed, the backwash bypass valve 47 is open, the concentrate gas introduction valve 48 is closed, and the filtrate gas introduction valve 49 is closed. Where the filtrate tank 12 is open to the atmospheric pressure, the filtrate pipe 22 is also open to the atmospheric pressure and hence filtrate in the filtrate pipe 22 can be caused to flow in the revere direction. Alternatively, a method of opening the filtrate gas introduction valve 49 to the atmospheric pressure may be employed.

The number 112 of hollow fiber membrane modules that are used simultaneously in executing the collection step may be the same as the number $n_1$ of hollow fiber membrane modules that are used in executing the filtration step. On the other hand, where the collection step is executed also using hollow fiber membrane modules that are used in executing the downstream recovery step, since filtrate to be recovered is returned to the primary sides in the containers 1 as backflow liquid, the amount of backflow liquid to be filtrated is increased in the recovery step and hence the recovery step takes long time. Thus, it is preferable to execute the collection step using hollow fiber membrane modules that are used in executing the filtration step but are not used in executing the recovery step. In this case, if a method of introducing pressurized gas from the second pressurized gas introduction pipe 26 is employed, following settings are made: the supply liquid valve 41 is closed, the filtrate valve 42 is closed, the concentrate valve 43 is open, the filtrate division valve 44 is closed, the filtrate bypass valve 45 is closed, the backwash valve 46 is closed, the backwash bypass valve 47 is open, the concentrate gas introduction valve 48 is closed, and the filtrate gas introduction valve 49 is open. The number $n_2$ of hollow fiber membrane modules that are used simultaneously in executing the collection step becomes smaller than the number $n_1$ of hollow fiber membrane modules that are used in executing the filtration step. That is, a relationship $n_1 \geq n_2$ is satisfied.

(Membrane Filtration Unit Operating Method: Recovery Step)

In the recovery step, backflow liquid is again introduced into the containers 1 from at least one of the raw liquid inlets 2 and the raw liquid outlets 4 and filtration is performed from the primary sides of the hollow fiber membranes 5 to their secondary sides. For example, if backflow liquid partially remains in the containers 1, this backflow liquid and backflow liquid that has been led out of the containers 1 are collected into the hollow fiber membrane module 36 and pressure filtration is performed by introducing pressurized gas from the first pressurized gas introduction pipe 25. At this time, the supply liquid valve 41 is closed, the filtrate valve 42 is closed, the concentrate valve 43 is closed, the filtrate division valve 44 is closed, the filtrate bypass valve 45 is open, the backwash valve 46 is closed, the backwash bypass valve 47 is closed, the concentrate gas introduction valve 48 is open, and the filtrate gas introduction valve 49 is closed.

In the hollow fiber membrane module 36, collected backflow liquid and raw liquid are introduced from the raw liquid inlet 2 into the primary side in the container 1 and filtered into the secondary side in the container 1 by gas pressure filtration. Recovery liquid obtained by the filtration is led out of the container from the filtrate outlet 3 and sent to the filtrate tank 12 via the filtrate bypass valve 45. The gas pressure filtration is continued until no filtrate comes to be led out of the container 1 from the filtrate outlet 3 of the hollow fiber membrane module 36.

At the end of the above-exemplified recovery step, the concentrate pipe 23 between the first pressurized gas introduction pipe 25 and the hollow fiber membrane modules 31-36, the primary sides in the containers 1 of the hollow fiber membrane modules 31-36, the secondary sides in the containers 1 of the hollow fiber membrane modules 31-35, and the filtrate pipe 22 between the filtrate outlets 3 of the hollow fiber membrane modules 31-36 and the filtrate division valve 44, the filtrate valve 42 and the backwash valve 46 become empty and filtrate remains only in the supply liquid pipe 21, the secondary side in the container 1 of the hollow fiber membrane module 36, and the filtrate bypass pipe 24.

Since as described above the number m of hollow fiber membrane modules that are used simultaneously in executing the recovery step is smaller than the number $n_2$ of hollow fiber membrane modules that are used simultaneously in executing the collection step, residual liquid existing in the secondary sides in the containers 1 and the filtrate pipe 22 can be recovered via the hollow fiber membrane modules that are used in executing the recovery step. There are no particular limitations on the number $n_3$ of hollow fiber membrane modules that are used in executing the recovery step, it may be determined as appropriate on the basis of the amount of liquid remaining in the membrane filtration unit, the time taken by the recovery step, and other factors as long as the relationship $n_3<n_2$ is satisfied. However, to further reduce the amount of liquid remaining in the membrane filtration unit, it is preferable that the recovery step be performed using only one hollow fiber membrane module ($n_3=1$).

If the recovery step is continued for a long time, there may occur a phenomenon that the clogging of the hollow fiber membranes 5 proceeds and the membrane filtration rate decreases. To avoid such a situation, it is preferable to clean the hollow fiber membrane modules on a regular basis. Example methods for cleaning only the hollow fiber membrane module 36 that is used in executing the recovery step include backwashing performed by causing the backwash pump 14 to operate with the following settings: the supply liquid valve 41 is closed, the filtrate valve 42 is closed, the concentrate valve 43 is open, the filtrate division valve 44 is open, the filtrate bypass valve 45 is closed, the backwash valve 46 is open, the backwash bypass valve 47 is closed, the concentrate gas introduction valve 48 is closed, and the filtrate gas introduction valve 49 is closed.

To push out recovery liquid remaining in the filtrate pipe 22 and the filtrate bypass pipe 24, it is preferable to send liquid remaining in these pipes to the filtrate tank 12 by introducing pressurized gas from the second pressurized gas introduction pipe 26. Although the amount of liquid remaining in these pipes is slight, this makes it possible to further increase the recovery rate of raw liquid. To recover liquid remaining in the filtrate bypass pipe 24, the following settings are made: the supply liquid valve 41 is closed, the filtrate valve 42 is closed, the concentrate valve 43 is closed, the filtrate division valve 44 is open, the filtrate bypass valve 45 is open, the backwash valve 46 is closed, the backwash bypass valve 47 is open, the concentrate gas introduction valve 48 is closed, and the filtrate gas introduction valve 49 is open. To recover liquid remaining in the filtrate pipe 22, the following settings are made: the supply liquid valve 41 is closed, the filtrate valve 42 is open, the concentrate valve 43 is closed, the filtrate division valve 44 is closed, the filtrate bypass valve 45 is closed, the backwash valve 46 is closed, the backwash bypass valve 47 is closed, the concentrate gas introduction valve 48 is closed, and the filtrate gas introduction valve 49 is open.

Where it is difficult to cause all filtrate remaining on the secondary sides of the hollow fiber membranes to flow in the reverse direction into the primary sides by executing the collection step only once, a set of the collection step and the recovery step may be executed plural times repeatedly.

Furthermore, it is preferable to use different sets of hollow fiber membrane modules in executing the collection step and in executing the recovery step. In this case, it is possible to execute the collection step and the recovery step simultaneously. More specifically, the collection step and the recovery step can be executed simultaneously by, for example, introducing pressurized gas from the second pressurized gas introduction pipe 26 and the first pressurized gas introduction pipe 25 at the same time. In this case, the following settings are made: the supply liquid valve 41 is closed, the filtrate valve 42 is closed, the concentrate valve 43 is closed, the filtrate division valve 44 is closed, the filtrate bypass valve 45 is open, the backwash valve 46 is closed, the backwash bypass valve 47 is open, the concentrate gas introduction valve 48 is open, and the filtrate gas introduction valve 49 is open. To prevent backflow liquid from being filtered again into the secondary sides in the containers 1, it is preferable to set the pressure P2 of pressurized gas that is introduced from the second pressurized gas introduction pipe 26 to execute the collection step higher than the pressure P3 of pressurized gas that is introduced from the first pressurized gas introduction pipe 25 to execute the recovery step.

Since the filtrate division valve 44 is closed in the above-mentioned settings, the pressurized gas introduced from the second pressurized gas introduction pipe 26 causes filtrate existing in the secondary sides in the containers 1 of the hollow fiber membrane modules 31-35 and the filtrate pipe 22 between the filtrate outlets 3 of the hollow fiber membrane modules 31-35 and the filtrate division valve 44, the filtrate valve 42, and the backwash valve 46 to flow in the reverse direction to the primary sides in the containers 1 of the hollow fiber membrane modules 31-35, whereby backflow liquid is obtained. At the same time, the pressurized gas introduced from the first pressurized gas introduction pipe 25 causes backflow liquid existing in the primary sides in the containers 1 of the hollow fiber membrane modules 31-35 to be led out from the raw liquid inlets 2, sent to the hollow fiber membrane module 36 via the supply liquid pipe 21 and collected there. In the hollow fiber membrane module 36, the collected backflow liquid is introduced into the primary side in the container 1 from the raw liquid inlet 2 and filtered into the secondary side in the container 1 by gas pressure filtration. Since the filtrate division valve 44 is closed and the filtrate bypass valve 45 is open, the filtered recovery liquid is sent to the tank via the filtrate bypass pipe 24 and recovered there. At this time, setting P2 higher than P3 is preferable because filtration is performed only in the hollow fiber membrane module 36 which is a module for recovery while refiltration is not performed in the hollow fiber membrane modules 31-35. It is even preferable that a relationship (P2−P3)>10 kPa be satisfied and it is further preferable that a relationship (P2−P3)>20 kPa be satisfied.

Since the above-described method makes it possible to execute the collection step and the recovery step simultaneously, the time to execute the collection step and the recovery step can be shortened and the operating rate of the membrane filtration unit can be increased.

The method for reducing the amount of liquid remaining in the secondary sides in the containers 1 and the filtrate pipe 22 has been described so far, the gas pressure filtration using pressurized gas cannot filter raw liquid located below the lower ends of the hollow fiber membranes 5 which can come into contact with raw liquid. As a result, in the membrane filtration unit in which all the hollow fiber membrane modules 31-36 which are connected to each other in parallel as shown in FIG. 2 are located above the supply liquid pipe 21 in the vertical direction, raw liquid existing below the lower ends of the hollow fiber membranes 5 in the primary sides in the containers 1 of the hollow fiber membrane modules 31-36 and raw liquid existing in the supply liquid pipe 21 are not filtered and become residual liquid.

Figure 3:
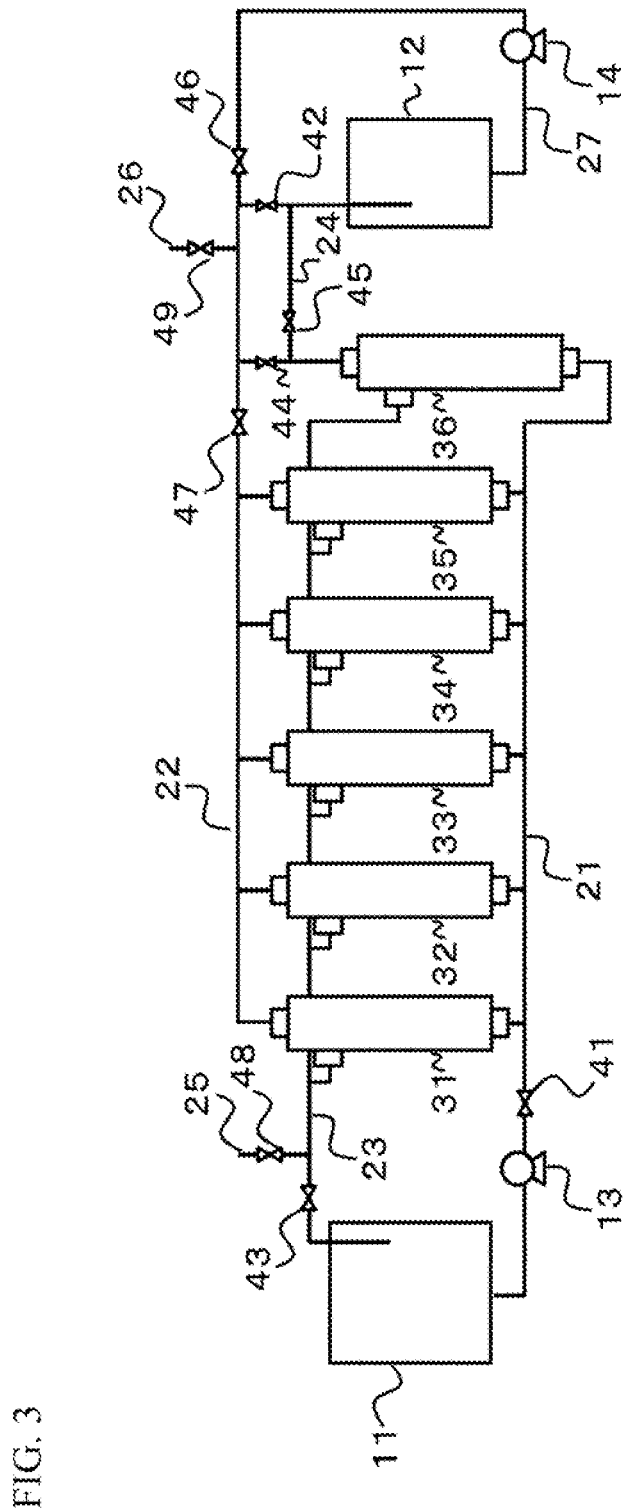
FIG. 3 is a rough flow diagram showing another form of a membrane filtration unit to which the operating method according to embodiments of the present invention is applied.

In the operating method of the membrane filtration unit according to the embodiment, the amount of liquid remaining in the supply liquid pipe 21 can be reduced by disposing the raw liquid inlet 2 of the hollow fiber membrane module 36 to be used in the recovery step below the raw liquid inlets 2 of the hollow fiber membrane modules 31-35 not to be used in the recovery step in the vertical direction as shown in FIG. 3.

In a recovery step using a membrane filtration unit shown in FIG. 3, for example, backflow liquid and raw liquid are collected into the hollow fiber membrane module 36 by introducing pressurized gas from the first pressurized gas introduction pipe 25 and the backflow liquid and the raw liquid are subjected to gas pressure filtration in the hollow fiber membrane module 36. In this case, since the raw liquid inlet 2 of the hollow fiber membrane module 36 is lower than the raw liquid inlets 2 of the hollow fiber membrane modules 31-35 in the vertical direction, backflow liquid existing below the lower ends of the hollow fiber membranes 5 in the primary sides in the containers 1 of the hollow fiber membrane modules 31-35 and raw liquid existing in the supply liquid pipe 21 settle so as to have the same liquid surface level in the vertical direction. As a result, in the hollow fiber membrane module 36, the liquid surface height in the primary side in the container 1 comes to be relatively higher than in the hollow fiber membrane modules 31-35 and hence wider portions of the hollow fiber membranes 5 in the hollow fiber membrane module 36 come to be immersed in the backflow liquid. At the same time, since pressurized gas is introduced from the first pressurized gas introduction pipe 25, part of the backflow liquid in contact with the hollow fiber membranes 5 of the hollow fiber membrane module 36 is filtered to the secondary side in the container 1 and recovered.

To enhance the effect described in the above example, it is preferable to dispose the raw liquid inlet 2 of the hollow fiber membrane module 36 lower than the lower end of the supply liquid pipe 21 and it is even preferable to dispose the lower ends of the hollow fiber membranes 5 of the hollow fiber membrane module 36 below the lower end of the supply liquid pipe 21. In this case, most of liquid remaining in the supply liquid pipe 21 can be sent to the hollow fiber membrane module 36.

Figure 4:
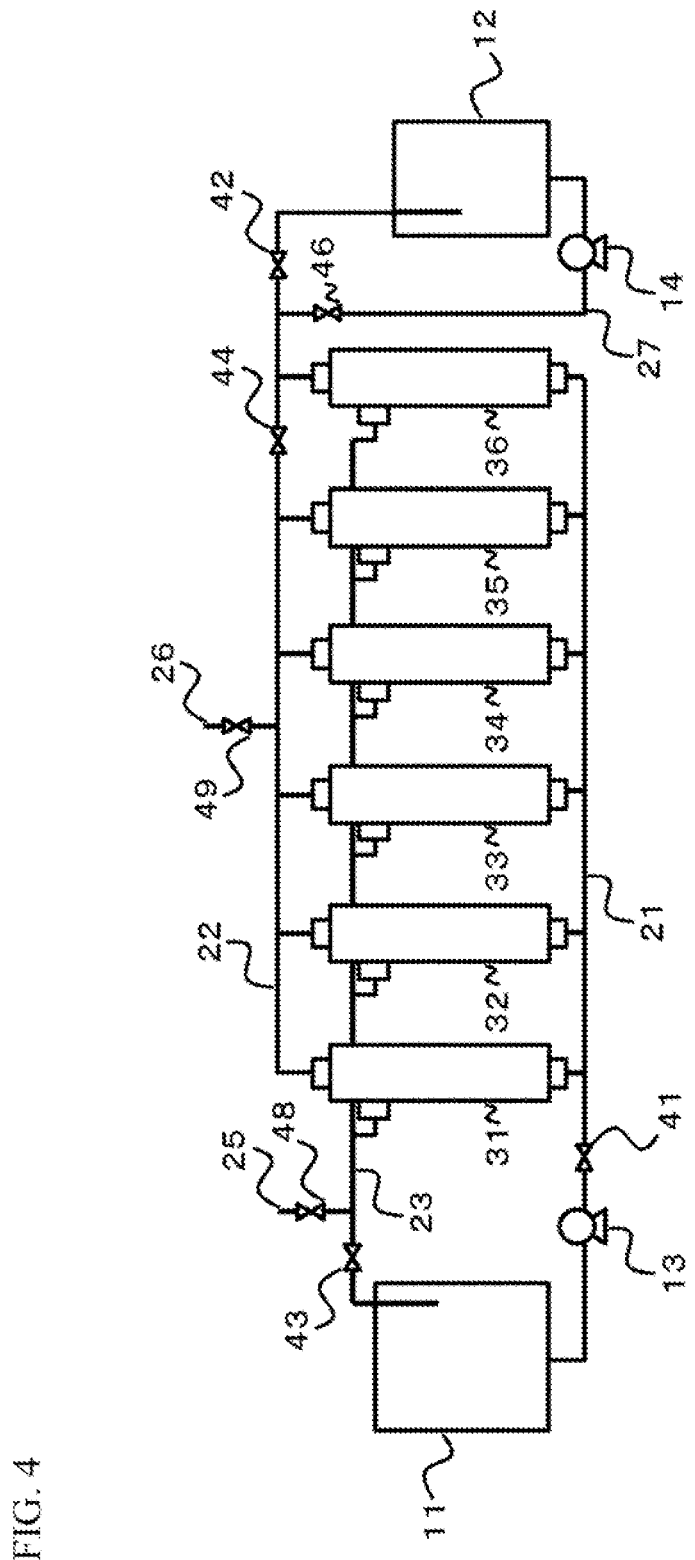
FIG. 4 is a rough flow diagram showing another form of a membrane filtration unit to which the operating method according to embodiments of the present invention is applied.

The operating method of the membrane filtration unit according to the embodiment can also be applied to another form of membrane filtration unit shown in FIG. 4. In the one form of membrane filtration unit exemplified in FIG. 4, the raw liquid tank 11 is connected to the raw liquid inlets 2 of the hollow fiber membrane modules 31-36 by the supply liquid pipe 21. The supply liquid pipe 21 branches downstream of the supply pump 13 which is disposed at a halfway position of the supply liquid pipe 21, and is connected to the hollow fiber membrane modules 31-36 in parallel. The filtrate outlets 3 of the hollow fiber membrane modules 31-36 are connected to the filtrate tank 12 in parallel by the filtrate pipe 22. The raw liquid outlets 4 of the hollow fiber membrane modules 31-36 are connected to the raw liquid tank 11 in parallel by the concentrate pipe 23. The supply liquid valve 41 is disposed at a halfway position of the supply liquid pipe 21 and the concentrate valve 43 is disposed at a halfway position of the concentrate pipe 23.

Furthermore, a filtrate division valve 44 which separates filtrate led out of the hollow fiber membrane modules 31-35 and filtrate led out of the hollow fiber membrane module 36 from each other so that they do not come into contact with each other is disposed in the filtrate pipe 22.

The second pressurized gas introduction pipe 26 for introducing gas is connected between the filtrate division valve 44 in the filtrate pipe 22 and the filtrate outlets 3 of the hollow fiber membrane modules 31-35, and the filtrate gas introduction valve 49 is disposed at a halfway position of the second pressurized gas introduction pipe 26. The first pressurized gas introduction pipe 25 for introducing gas is connected between the concentrate valve 43 in the concentrate pipe 23 and the raw liquid outlets 4 of the hollow fiber membrane modules 31-35, and the filtrate gas introduction valve 48 is disposed at a halfway position of the first pressurized gas introduction pipe 25.

The backwash pipe 27 connecting the filtrate tank 12 and the filtrate pipe 22 is provided, and the backwash pump 14 and the backwash valve 46 for sending filtrate from the filtrate tank 12 to the hollow fiber membrane modules 31-36 are disposed at halfway positions of the backwash pipe 27.

When the membrane filtration unit shown in FIG. 4 is used, since it does not have the filtrate bypass pipe 24 which is provided in the membrane filtration unit shown in FIG. 2, the filtration unit is simpler in configuration though the amount of residual liquid existing in the filtrate pipe 22 at the end of the recovery step may increase.

As another form of membrane filtration unit according to the embodiment, another hollow fiber membrane module may be connected in series downstream of the raw liquid outlet 4 of the of hollow fiber membrane modules connected in parallel. The expression "connected in series" as used herein means such a connection form that at least part of raw liquid introduced into one hollow fiber membrane module is led out of this hollow fiber membrane module and introduced into another hollow fiber membrane module connected to downstream of it. In this case, for example, of two hollow fiber membrane modules connected to each other in series, the downstream hollow fiber membrane module is possibly provided with the raw liquid inlet 2 at the top in the vertical direction and with the raw liquid outlet 4 at the bottom in the vertical direction. In such a membrane filtration unit according to the embodiment, in the downstream one of the series-connected hollow fiber membrane modules, backflow liquid is lead out from the raw liquid outlet 4 of the hollow fiber membrane modules in the collection step and the backflow liquid is introduced into the hollow fiber membrane module from its raw liquid outlet 4 in the recovery step.

It is preferable that the material of hollow fiber membranes to which the membrane filtration unit operating method according to the embodiment is applied be a hydrophobic resin. Where membranes made of a hydrophilic resin are used, even when the membranes are dried by supplying pressurized gas to the filtrate side from the raw liquid side, the membranes turn completely wet by supplying liquid again. Thus, no deterioration occurs in water permeability; originally it is not necessary to apply the operating method of a membrane filtration unit according to the embodiment.

On the other hand, where membranes made of a hydrophobic resin are used, when the membranes are dried by supplying pressurized gas to the filtrate side from the raw liquid side, the membranes do not turn wet completely even if liquid is supplied again; accordingly the water permeability lowers. The embodiment is an operating method that is suitable for a membrane filtration unit using such separation membranes that cannot be dried.

Example hydrophobic resins are fluorine-based resins and olefin-based resins. Resins that are larger than or equal to 80° in contact angle are preferable and resins that are larger than or equal to 90° in contact angle are even preferable. Plural kinds of resins may be contained as long as the contact angle is in this range.

Among hydrophobic resins, fluorine-based resins are preferable and polyvinylidene difluoride is even preferable from the viewpoint of strength.

As for measurement of a contact angle, after a separation membrane shaped like a hollow fiber membrane is cleaned sufficiently by ethanol or pure water and vacuum-dried sufficiently, the surface of the separation membrane is made flat. An average value of contact angles measured after a lapse of 2 to 5 seconds from dropping of a pure water droplet onto the surface of separation membrane is employed as a contact angle. A contact angle is determined by the θ/2 method. The θ/2 method is a method of obtaining a contact angle θ from an angle (θ/2) that is formed by a straight line connecting a left or right end point of a water droplet and its top and the membrane surface.

To prevent drying of the hollow fiber membranes, it is preferable that the pressure for introducing the pressurized gas be lower than or equal to a bubble point pressure. The bubble point pressure is determined by, for example, introducing pressurized gas from one end of a hollow fiber membrane and increasing the pressure gradually after the hollow fiber membrane was wetted by ethanol or the like and then pores of the hollow fiber membrane were filled with prescribed liquid, and regarding a minimum pressure at which generation of bubbles from the surface at the other end is detected as the bubble point pressure. It is preferable that the liquid for making the hollow fiber membrane wet in measuring a bubble point pressure be the same liquid as raw liquid to be filtered actually or a liquid that is equivalent in surface tension to the raw liquid.

EXAMPLES (Preparation of Hollow Fiber Membrane Module)

A cartridge-type hollow fiber membrane module as exemplified in FIG. 1 was prepared using 7,000 PVDF hollow fiber membranes (HFM membrane) manufactured by Toray Industries, Inc. The two ends of the hollow fiber membranes 5 were fixed by potting portions 8 formed by centrifugal potting and the hollow fiber membranes 5 were sealed at one of the two ends. The inner diameter of the container 1 was 159 mm. The contact angle of the hollow fiber membranes 5 was 95° and the bubble point pressure was 180 kPa.

Example 1

A membrane filtration unit exemplified in FIG. 2 was constructed by using six hollow fiber membrane modules prepared in such a manner that their longitudinal direction coincides with the vertical direction.

The filtration step was executed by a crossflow filtration operation by sending raw liquid from the raw liquid tank 11 to the hollow fiber membrane modules 31-36 by the supply pump 13. At this time, the supply liquid valve 41 was open, the filtrate valve 42 was open, the concentrate valve 43 was open, the filtrate division valve 44 was open, the filtrate bypass valve 45 was closed, the backwash valve 46 was closed, the backwash bypass valve 47 was open, the concentrate gas introduction valve 48 was closed, and the filtrate gas introduction valve 49 was closed. The crossflow flow rate and the filtration flow rate were set at 103 $m^3$/hr and 7.7 $m^3$/hr, respectively.

Backwashing was performed in the middle of the filtration step to clean clogging of the hollow fiber membranes 5. More specifically, filtrate liquid was sent to the hollow fiber membrane modules 31-36 from the filtrate tank 12 by the backwash pump 14. At this time, the supply liquid valve 41 was closed, the filtrate valve 42 was closed, the concentrate valve 43 was open, the filtrate division valve 44 was open, the filtrate bypass valve 45 was closed, the backwash valve 46 was open, the backwash bypass valve 47 was open, the concentrate gas introduction valve 48 was closed, and the filtrate gas introduction valve 49 was closed. The backwash flow rate was set at 10.4 $m^3$/hr.

In the filtration step, a cycle consisting of the above-mentioned crossflow filtration operation for 9 minutes and the above-mentioned backwashing for 1 minute was performed repeatedly. The crossflow filtration operation was stopped when the amount of raw liquid became small and liquid sending was completed to the lower limit level of the raw liquid tank 11, and then gas pressure filtration was started by introducing nitrogen gas of 100 kPa from the first pressurized gas introduction pipe 25. At this time, the supply liquid valve 41 was closed, the filtrate valve 42 was open, the concentrate valve 43 was closed, the filtrate division valve 44 was open, the filtrate bypass valve 45 was closed, the backwash valve 46 was closed, the backwash bypass valve 47 was open, the concentrate gas introduction valve 48 was open, and the filtrate gas introduction valve 49 was closed. The gas pressure filtration was performed until there was no filtrate led out from the filtrate outlet 3 of each hollow fiber membrane module. Subsequently, the first pressurized gas introduction pipe 25 was opened to atmospheric pressure and set the concentrate pipe 23 at normal pressure to finish the filtrate step.

In the collection step, nitrogen gas of 100 kPa was introduced from the second pressurized gas introduction pipe 26, whereby filtrate existing in the containers was caused to flow in the reverse direction from the secondary sides to the primary sides and backflow liquid was obtained. At this time, the supply liquid valve 41 was closed, the filtrate valve 42 was closed, the concentrate valve 43 was open, the filtrate division valve 44 was open, the filtrate bypass valve 45 was closed, the backwash valve 46 was closed, the backwash bypass valve 47 was open, the concentrate gas introduction valve 48 was closed, and the filtrate gas introduction valve 49 was open. The pressurization was continued for 1 minute.

Subsequently, nitrogen gas of 100 kPa was introduced from the first pressurized gas introduction pipe 25. At this time, the supply liquid valve 41 was closed, the filtrate valve 42 was closed, the concentrate valve 43 was closed, the filtrate division valve 44 was closed, the filtrate bypass valve 45 was open, the backwash valve 46 was closed, the backwash bypass valve 47 was closed, the concentrate gas introduction valve 48 was open, and the filtrate gas introduction valve 49 was closed. As a result, backflow liquid existing in the primary sides in the containers 1 of the hollow fiber membrane modules 31-35 was led out of the containers 1 from the raw liquid inlets.

In the recovery step, the backflow liquid was introduced into the container 1 of the hollow fiber membrane module 36 via the supply liquid pipe 21. Then pressure filtration was performed by introducing nitrogen gas of 100 kPa from the first pressurized gas introduction pipe 25. At this time, the supply liquid valve 41 was closed, the filtrate valve 42 was closed, the concentrate valve 43 was closed, the filtrate division valve 44 was closed, the filtrate bypass valve 45 was open, the backwash valve 46 was closed, the backwash bypass valve 47 was closed, the concentrate gas introduction valve 48 was open, and the filtrate gas introduction valve 49 was closed; filtration was performed only by the hollow fiber membrane module 36. Obtained recovery liquid was led out of the container 1 from the filtrate outlet 3, sent to the filtrate tank 12 via the filtrate bypass pipe 24, and recovered there. Pressure filtration was performed until there was no recovery liquid led out from the filtrate outlet 3 of the hollow fiber membrane module 36, and the recovery step was finished.

In this operation, the amount of liquid remaining finally inside the pipes etc. of the membrane filtration unit was 31 L. The collection step and the recovery step took 9 minutes.

Example 2

The same membrane filtration unit operating method as in Example 1 was performed except that in the collection step the filtrate division valve 44 was closed and reverse flowing was caused in the hollow fiber membrane modules 31-35 when filtrate was caused to flow in the reverse direction from the secondary sides of the hollow fiber membranes to their primary sides.

In this operation, the amount of liquid remaining finally inside the pipes etc. of the membrane filtration unit was 31 L. The collection step and the recovery step took 7 minutes.

Example 3

The same membrane filtration unit operating method as in Example 1 was performed except that the collection step and the recovery step were executed simultaneously. To execute the collection step and the recovery step simultaneously, reverse flowing was caused by introducing nitrogen gas of 150 kPa from the second pressurized gas introduction pipe 26 and, at the same time, pressure filtration was performed by introducing nitrogen gas of 100 kPa from the first pressurized gas introduction pipe 25.

In this operation, the amount of liquid remaining finally inside the pipes etc. of the membrane filtration unit was 31 L. The collection step and the recovery step took 6 minutes.

Example 4

The same membrane filtration unit operating method as in Example 1 was performed except that a membrane filtration unit exemplified in FIG. 3 using six hollow fiber membrane modules prepared was constructed. The raw liquid inlet 2 of only the hollow fiber membrane module 36 was disposed below the lower end of the supply liquid pipe 21 in the vertical direction by 300 mm.

In this operation, the amount of liquid remaining finally inside the pipes etc. of the membrane filtration unit was 9 L. The collection step and the recovery step took 14 minutes.

Comparative Example 1

A membrane filtration unit exemplified in FIG. 2 was constructed by using six hollow fiber membrane modules prepared in such a manner that their longitudinal direction coincides with the vertical direction.

The filtration step was executed by a crossflow filtration operation by sending raw liquid from the raw liquid tank 11 to the hollow fiber membrane modules 31-36 by the supply pump 13. At this time, the supply liquid valve 41 was open, the filtrate valve 42 was open, the concentrate valve 43 was open, the filtrate division valve 44 was open, the filtrate bypass valve 45 was closed, the backwash valve 46 was closed, the backwash bypass valve 47 was open, the concentrate gas introduction valve 48 was closed, and the filtrate gas introduction valve 49 was closed. The crossflow flow rate and the filtration flow rate were set at 103 $m^3$/hr and 7.7 $m^3$/hr, respectively. Backwashing was performed in the middle of the filtration step to clean clogging of the hollow fiber membranes 5. More specifically, filtrate liquid was sent to the hollow fiber membrane modules 31-36 from the filtrate tank 12 by the backwash pump 14. At this time, the supply liquid valve 41 was closed, the filtrate valve 42 was closed, the concentrate valve 43 was open, the filtrate division valve 44 was open, the filtrate bypass valve 45 was closed, the backwash valve 46 was open, the backwash bypass valve 47 was open, the concentrate gas introduction valve 48 was closed, and the filtrate gas introduction valve 49 was closed. The backwash flow rate was set at 10.4 $m^3$/hr.

In the filtration step, a cycle consisting of the above-mentioned crossflow filtration operation for 9 minutes and the above-mentioned backwashing for 1 minute was performed repeatedly. The crossflow filtration operation was stopped and the filtration step was finished when the amount of raw liquid became small and liquid sending was completed to the lower limit level of the raw liquid tank 11.

Subsequently, the recovery step was executed without executing the collection step. In the recovery step, pressure filtration was performed by introducing nitrogen gas of 100 kPa from the first pressurized gas introduction pipe 25. At this time, the supply liquid valve 41 was closed, the filtrate valve 42 was closed, the concentrate valve 43 was closed, the filtrate division valve 44 was closed, the filtrate bypass valve 45 was open, the backwash valve 46 was closed, the backwash bypass valve 47 was closed, the concentrate gas introduction valve 48 was open, and the filtrate gas introduction valve 49 was closed; filtration was performed only by the hollow fiber membrane module 36. Obtained recovery liquid was sent to the filtrate tank 12 via the filtrate bypass pipe 24 and recovered there. Pressure filtration was performed until there was no recovery liquid led out from the filtrate outlet 3 of the hollow fiber membrane module 36, and the recovery step was finished.

In this operation, the amount of liquid remaining finally inside the pipes etc. of the membrane filtration unit was 55 L. The recovery step took 24 minutes.

The present invention has been described in detail by referring to the particular embodiment, it is apparent to those skilled in the art that various changes and modifications are possible without departing from the spirit and scope of the invention.

The operating method of a membrane filtration unit according to the present invention is applied preferably to membrane filtration of raw liquid in a water treatment field such as drinking water manufacture, water purification treatment, and effluent treatment, a fermentation field that involves cultivation of microbes or cultivation cells, and a food industry field.

DESCRIPTION OF SYMBOLS

1: Container
2: Raw liquid inlet
3: Filtrate outlet
4: Raw liquid outlet
5: Hollow fiber membranes
6: Raw liquid-side space (primary side)
7: Filtrate-side space (secondary side)
8: Potting portion
11: Raw liquid tank
12: Filtrate tank
13: Supply pump
14: Backwash pump
21: Supply liquid pipe
22: Filtrate pipe
23: Concentrate pipe
24: Filtrate bypass pipe
25: First pressurized gas introduction pipe
26: Second pressurized gas introduction pipe
27: Backwash pipe
28: Filtrate recovery pipe
31-36: Hollow fiber membrane modules
41: Supply liquid valve
42: Filtrate valve
43 Concentrate valve
44: Filtrate division valve
45: Filtrate bypass valve
46: Backwash valve
47: Backwash bypass valve
48: Concentrate gas introduction valve
49: Filtrate gas introduction valve

The invention claimed is:

1. A method of operating a membrane filtration unit, the membrane filtration unit comprising a plurality of hollow fiber membrane modules connected to each other in parallel, each hollow fiber membrane module comprising a container which has a raw liquid inlet, a filtrate outlet, and a raw liquid outlet and is filled with hollow fiber membranes, the method comprising:

a filtration step of introducing a raw liquid into the container from the raw liquid inlet, filtering the raw liquid through the hollow fiber membranes from a primary side to a secondary side, and leading out resulting filtrate to outside the container from the filtrate outlet;

a collection step of causing the filtrate existing in the container to flow in a reverse direction through the hollow fiber membranes from the secondary side to the primary side and leading out resulting backflow liquid to outside the container from at least one of the raw liquid inlet and the raw liquid outlet; and a recovery step of introducing the backflow liquid into the container again from at least one of the raw liquid inlet and the raw liquid outlet, filtering the backflow liquid through the hollow fiber membranes from the primary side to the secondary side, and leading out resulting recovery liquid to outside the container from the filtrate outlet, wherein a relation of $n_1 \geq n_2 > n_3$ is satisfied, where $n_1$ is the number of the hollow fiber membrane modules simultaneously used in executing the filtration step, $n_2$ is the number of the hollow fiber membrane modules simultaneously used in executing the collection step, and $n_3$ is the number of the hollow fiber membrane modules simultaneously used in executing the recovery step;

wherein the filtration step introduces raw liquid through $n_1$ hollow fiber membrane modules, the collection step introduces filtrate into $n_2$ hollow fiber membrane modules, and the recovery step introduces backflow liquid into $n_3$ hollow fiber membrane modules.

2. The method of operating a membrane filtration unit according to claim 1, wherein at least one of the hollow fiber membrane modules is used in executing the recovery step and at least one of the hollow fiber membrane modules is used in executing the collection step, wherein the at least one hollow fiber membrane module used in executing the recovery step is different from the at least one hollow fiber membrane module used in executing the collection step.

3. The method of operating a membrane filtration unit according to claim 1, wherein the collection step and the recovery step are executed using pressurized gas and a pressure P2 of the pressurized gas used in executing the collection step and a pressure P3 of the pressurized gas used in executing the recovery step satisfy a relation of $P3<P2$.

4. The method of operating a membrane filtration unit according to claim 2, wherein the raw liquid inlet of the at least one of the hollow fiber membrane modules used in executing the recovery step is located below the raw liquid inlet of at least one of the hollow fiber membrane modules that is not used in executing the recovery step in a vertical direction.

5. The method of operating a membrane filtration unit according to claim 3, wherein the hollow fiber membranes are membranes made of a hydrophobic resin.

6. The method of operating a membrane filtration unit according to claim 5, wherein the hydrophobic resin comprises polyvinylidene difluoride.

* * * * *

UNITED STATES PATENT AND TRADEMARK OFFICE
CERTIFICATE OF CORRECTION

| | | |
|---|---|---|
| PATENT NO. | : 12,383,867 B2 | Page 1 of 1 |
| APPLICATION NO. | : 17/432675 | |
| DATED | : August 12, 2025 | |
| INVENTOR(S) | : Kentaro Kobayashi and Atsushi Kobayashi | |

It is certified that error appears in the above-identified patent and that said Letters Patent is hereby corrected as shown below:

On the Title Page

Under item (56) FOREIGN PATENT DOCUMENTS, "CN 104656437 A" should read -- CN 104556437 A --.

Signed and Sealed this
Eleventh Day of November, 2025

John A. Squires
*Director of the United States Patent and Trademark Office*